J. C. BICKFORD.
Rolling India Rubber.
No. 2,263. Reissued June 5, 1866.
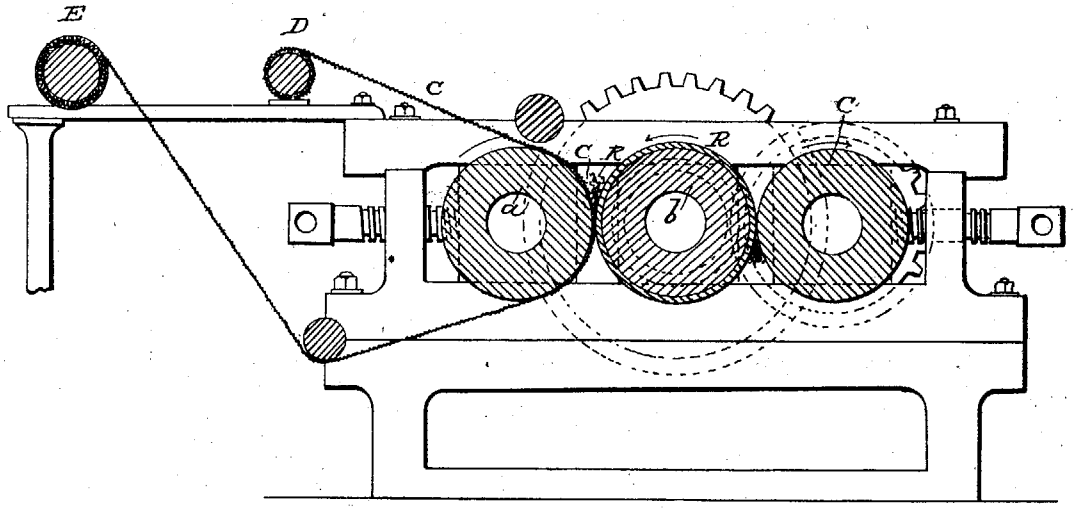
WITNESSES:
Frederick Curtis
D. P. Hale Jr.
INVENTOR.
Francis Dwight and
I E Seaborn
by their attorney
R. H. Eddy.

UNITED STATES PATENT OFFICE.

FRANCIS D. HAYWARD, OF MALDEN, AND IRA E. SANBORN, OF BOSTON, MASSACHUSETTS, ASSIGNEES OF JOHN C. BICKFORD.

IMPROVED PROCESS FOR ROLLING INDIA-RUBBER.

Specification forming part of Letters Patent No. 7,189, dated March 19, 1850; extended seven years; Reissue No. 2,207, dated March 20, 1866; Reissue No. 2,263, dated June 5, 1866.

DIVISION B.

*To all whom it may concern:*

Whereas Letters Patent No. 7,189 were granted to FRANCIS D. HAYWARD and JOHN C. BICKFORD, on the 19th day of March, in the year 1850, for a new and useful Process of Rolling India-Rubber Cloth, or, in other words, for coating cloth or other material with caoutchouc; and whereas the term for which said Letters Patent were originally granted has been extended by the Commissioner of Patents for a further period of seven years; and whereas we, the undersigned, have become, by assignment or otherwise, the sole proprietors of the said patent and the exclusve property covered thereby; now, therefore, for the purpose of a reissue of the said patent, we do hereby declare the following to be a full and correct description of the invention of the said patentees.

The said invention consists in a new process of applying india-rubber, when reduced to a plastic consistency, onto cloth, whereby greater and more permanent adhesion of the rubber to the cloth can be secured than by any process heretofore known.

To make the invention clearly understood, we will describe the ordinary process of coating cloths with rubber, in the performance of which the india-rubber is placed between a series of two or more iron rolls heated internally by steam and made to revolve by suitable machinery. The heat and the pressure soften and grind the rubber into an adhesive plastic mass, which can be molded into desired shapes or spread upon cloth.

The ordinary method of spreading rubber upon cloth has been to pass the cloth and the adhesive rubber between two or more revolving rolls, by the action of which the rubber has been spread out into an even sheet, covering the outside of the cloth. This sheet of rubber can, when cool, be stripped from the cloth and used for various purposes in manufacturing, or the cloth with its outside covering of rubber, such as described, can be used for carriage-covers or sundry other devices; but it has been found that for other purposes in rubber manufactures, such as machine-belting, conducting-hose, the linings of shoes, &c., it was necessary that the rubber should be forced into the body of the cloth—*i. e.*, into the meshes or spaces left by the threads of the cloth—so that the cloth could be prepared with rubber forced into it and incorporated with its threads or fibers, in order to render the prepared cloth partially adhesive, whereby other coats of rubber could be added to it and made to adhere to it.

The old process for accomplishing this latter object was to dissolve india-rubber in spirits of turpentine or camphene until it was so soft that it could be spread upon cloth by means of rollers. This rubber dissolved in camphene was so much softer than the rubber made plastic by grinding between heated iron rollers that it was, by simple pressure, forced into the meshes of the cloth, and for some purposes accomplished the desired end. This method of manufacture was open to great objection on account of the expense of the camphene used in dissolving the rubber, the disagreeable odor imparted to goods by it, the danger of fire or explosion, the necessity of great space in the factory for drying the goods before they could be used, and the injury to the health of operators in such factories. To obviate these difficulties many experiments were instituted by the said HAYWARD and BICKFORD, the main object being to dispense with the use of camphene and yet be able to produce cloth with a coat of gum forced into and incorporated with the cloth. In order to accomplish this result in accordance with the invention of the said parties, a series of hollow iron rolls heated internally by steam are to be employed and made to revolve by machinery. These rollers do not require very particular description, as they are familiar to rubber-manufacturers. A series of two or more rolls can be used. Two rolls contiguous, whether laterally or one above the other, revolving in opposite directions, one carrying the cloth to be coated, the other the coat of rubber to be applied, perform the functions necessary to this invention, on condition that the roll which conveys the rubber to the cloth shall revolve with a velocity exceeding that of the roll which carries the cloth. If the two rolls move either with equal velocities, or if the roll carrying the cloth moves faster than the roll carrying the rubber, the object of the invention will not be attained.

The accompanying drawing exhibits a set of three of such rolls, *a b c*, with the cloth C and the rubber R applied to them, the directions of rotary motion of such rollers as well as the direction of the movement of the cloth being indicated by arrows.

D is the roller from which the cloth proceeds. E is another roller, on which the cloth is wound after having been coated with the rubber.

A quantity of india-rubber, previously prepared by being ground, is placed between two of the rolls, which revolve until in a short time the mass of rubber is still further heated and softened and spread in a thick sheet or coat around the fast roll. The thickness of the coat may be such as may be desirable, according to the nature, quantity, and quality of the cloth. The cloth, rolled on a suitable reel, sleeve, roll, or shell, is next to be brought to the machine, and is to have one end placed upon one of the slow rolls, in order that it may be between it and the faster roll. The faster roll, being the middle one of the set, as it revolves, drives a portion of its rubber into or through the meshes of the cloth and incorporates it with the threads of the cloth. In this process a portion of the sheet of rubber which covers the faster roll is collected into a mass (called by rubber workmen the "bank") between the cloth and the faster roll, and this bank is rolled over and over by means of the action of the rollers, and assists in the operation of forcing the coat into the cloth. This is what we call, for convenience, the "friction-coat," and the cloth so called can be immediately used in manufacturing. It is often necessary that the cloth should have a similar friction-coat upon its other side, and this object is accomplished by reversing the cloth and again passing it in a similar way through the machine.

In practical manufacturing the velocities of the rolls differ according to the nature of the rubber and the ingredients combined with it, and according to the nature of the work, whether coarse or fine, heavy or light. In case of the ordinary thin cloths used for shoe-linings it has been found best that the slower rolls should make six revolutions while the faster roll makes nine revolutions; but in coating the heavy duck used in machine-belting the difference in speed should be much greater.

What we claim as the invention of the said HAYWARD and BICKFORD is—

Cloth coated with rubber in the manner and by the means hereinbefore described, as a new fabric or article of manufacture.

In testimony whereof we have signed our names to this specification before two subscribing witnesses.

FRANCIS D. HAYWARD.
IRA E. SANBORN.

Witnesses:
J. N. DURELL,
HENRY S. PERKINS.